(12) United States Patent
Uefune et al.

(10) Patent No.: US 9,093,094 B2
(45) Date of Patent: Jul. 28, 2015

(54) HARD DISK DRIVE ACTUATOR ASSEMBLY WITH INTERLEAVED VOICE COIL MOTOR

(71) Applicant: HGST Netherlands B.V., Amsterdam (NL)

(72) Inventors: Kouki Uefune, Hiratsuka (JP); Takenori Atsumi, Yamato (JP); Hajime Eguchi, Fujisawa (JP); Shigenori Takada, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/095,819

(22) Filed: Dec. 3, 2013

(65) Prior Publication Data

US 2015/0154994 A1    Jun. 4, 2015

(51) Int. Cl.
*G11B 5/55*     (2006.01)
*G11B 5/48*     (2006.01)

(52) U.S. Cl.
CPC ............ *G11B 5/5573* (2013.01); *G11B 5/4833* (2013.01); *G11B 5/55* (2013.01)

(58) Field of Classification Search
CPC ............ G11B 5/55; G11B 5/54; G11B 21/08; G11B 21/22
USPC .............. 360/264.7, 264.8, 264.9, 265, 265.8
See application file for complete search history.

(56) References Cited

U.S. PATENT DOCUMENTS

| 5,432,663 | A | * | 7/1995 | Ichihara | ..................... 360/264.7 |
| 5,680,276 | A | | 10/1997 | Takekado | |
| 5,734,527 | A | | 3/1998 | Reinhart | |
| 6,731,454 | B2 | | 5/2004 | Sri-Jayantha et al. | |
| 6,747,836 | B2 | | 6/2004 | Stevens et al. | |
| 7,352,536 | B2 | | 4/2008 | Kim | |
| 7,576,954 | B2 | * | 8/2009 | Wei et al. | ...................... 360/265 |
| 7,606,005 | B2 | | 10/2009 | Shin | |
| 7,876,532 | B2 | * | 1/2011 | Scura et al. | ................ 360/264.7 |
| 8,159,787 | B2 | | 4/2012 | Choi et al. | |
| 8,289,657 | B2 | | 10/2012 | Ohta et al. | |
| 8,295,012 | B1 | | 10/2012 | Tian et al. | |
| 8,363,360 | B2 | | 1/2013 | Uefune et al. | |
| 8,416,535 | B2 | | 4/2013 | Korkowski et al. | |

(Continued)

FOREIGN PATENT DOCUMENTS

EP    0426132 A2    5/1991
GB    2099206 A    12/1982

(Continued)

OTHER PUBLICATIONS

GB Examiner Ralph Cannon, Combined Search and Examination Report under Sections 17 and 18(3), Apr. 30, 2015, 8 pages, Patents Directorate.

*Primary Examiner* — Allen T Cao
(74) *Attorney, Agent, or Firm* — John D. Henkhaus

(57) ABSTRACT

Approaches to a rotary actuator assembly configured for use in a hard disk drive (HDD) include a voice coil interleaved between the pivot bearing and the actuator arm, providing a longer pivot-to-head dimension which reduces the radius of curvature of the arc in which the head slider travels over the disk for accessing portions of the disk. Reducing the arc radius of curvature reduces the maximum skew angles of the read-write head in association with the disk tracks. The width of the actuator arm can be widened to provide improved operating characteristics even in view of the longer pivot-to-head dimension.

19 Claims, 4 Drawing Sheets

(56) References Cited

U.S. PATENT DOCUMENTS

2002/0054457 A1    5/2002    Koganezawa
2009/0059434 A1    3/2009    Heo et al.

FOREIGN PATENT DOCUMENTS

| | | |
|---|---|---|
| JP | 05-298615 | 11/1993 |
| JP | 2001-101633 | 4/2001 |

* cited by examiner

HARD DISK DRIVE ACTUATOR ASSEMBLY WITH INTERLEAVED VOICE COIL MOTOR

FIELD OF THE INVENTION

Embodiments of the invention relate generally to hard disk drives and more particularly to an actuator assembly for a hard disk drive read/write head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. However, reducing the disk area needed to record a bit leads to corresponding challenges regarding the precision with which the read/write head can be positioned and maintained over the disk and the corresponding disk tracks to read and write smaller and smaller bits.

SUMMARY OF EMBODIMENTS OF THE INVENTION

Embodiments of the invention are directed towards a rotary actuator assembly configured for use in a hard disk drive (HDD), where the actuator assembly comprises an interleaved actuating portion that includes a distal end with which an actuator arm is coupled, a proximal end housing a pivot bearing, and a voice coil interleaved at the distal end between the pivot bearing and the actuator arm. Such a configuration is in contrast to typical actuator assemblies in which the pivot bearing is positioned between the voice coil and the actuator arm.

In comparison with typical actuator assemblies, an interleaved actuating portion according to embodiments provides for longer pivot-to-head and pivot-to-spindle dimensions which reduce the radius of curvature of the arc in which the head slider travels over the disk for accessing portions of the disk. Reducing the arc radius of curvature reduces the maximum skew angles of the read-write head in association with the disk tracks. Additionally, the width of the actuator arm can be widened to provide better operating characteristics of the actuator system in comparison with typical actuator systems having the pivot bearing between the voice coil and actuator arm, even in view of the longer pivot-to-head dimension of the described interleaved actuating portion.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a hard disk drive (HDD) actuator assembly having an interleaved voice coil motor are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

PHYSICAL DESCRIPTION OF ILLUSTRATIVE EMBODIMENTS OF THE INVENTION

Figure 1:
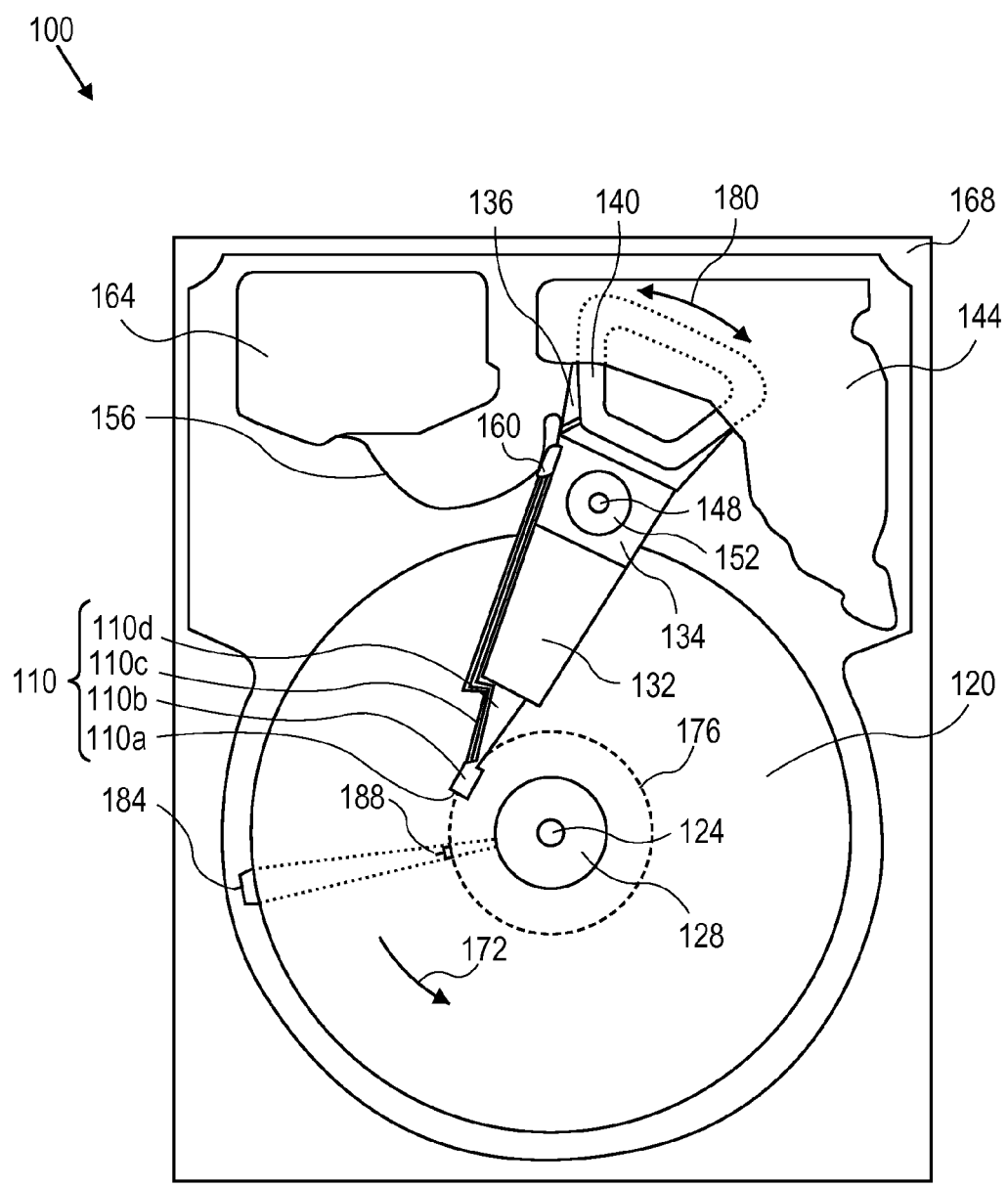
FIG. 1 is a plan view of a conventional hard disk drive (HDD)

Embodiments of the invention may be used in the context of a magnetic writer for a hard-disk drive (HDD). A plan view illustrating a conventional HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor attached to the spindle 124 for rotating the media 120. The head 110a includes a write element and a read element for respectively writing and reading information stored on the media 120 of the HDD 100. The media 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet. The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
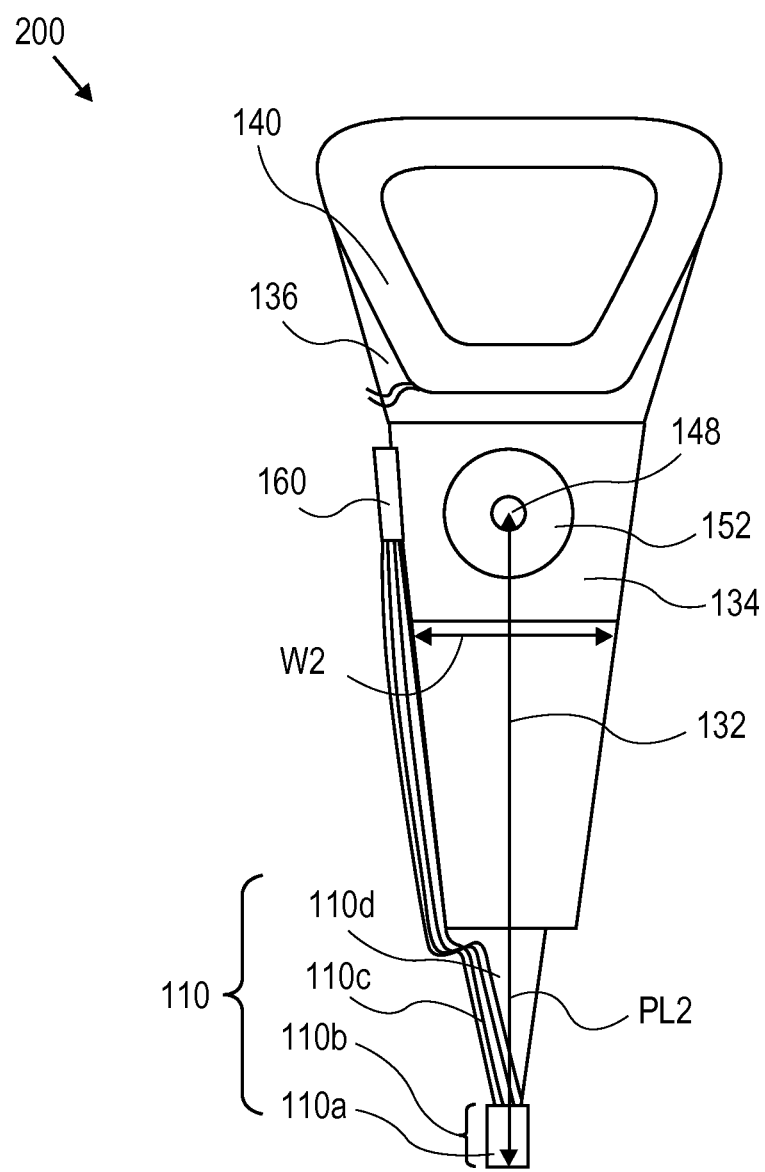
FIG. 2 is a plan view of a conventional rotary actuator assembly.

FIG. 2 is a plan view of a conventional rotary actuator assembly 200, including the HGA 110. FIG. 2 illustrates the functional arrangement of a head arm assembly (HAA) with respect to the HGA 110. The HAA includes the arm 132 and HGA 110 including the slider 110b including the head 110a. The HAA is attached at the arm 132 to the carriage 134. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152. Note that conventionally the pivot is positioned between the voice coil 140 and the arm 132, and that arm 132 has a maximum width, W2, and a pivot length (distance between pivot and head), PL2.

INTRODUCTION

In order to increase the storage density of HDDs, a reduction of the skew angle, which is the angle of the head slider relative to the disk track direction at a particular location on the disk, is desirable. Further, improvement in the position following performance, which is the ability of the head slider to maintain precise positioning along the track direction, is also desirable for realization of high storage densities. In order to reduce a skew angle, lengthening the distance between the head and the pivot is desirable. However, the control performance of an actuator generally falls as a result of lengthening the arm.

Actuator Assembly with Interleaved Voice Coil

Figure 3:
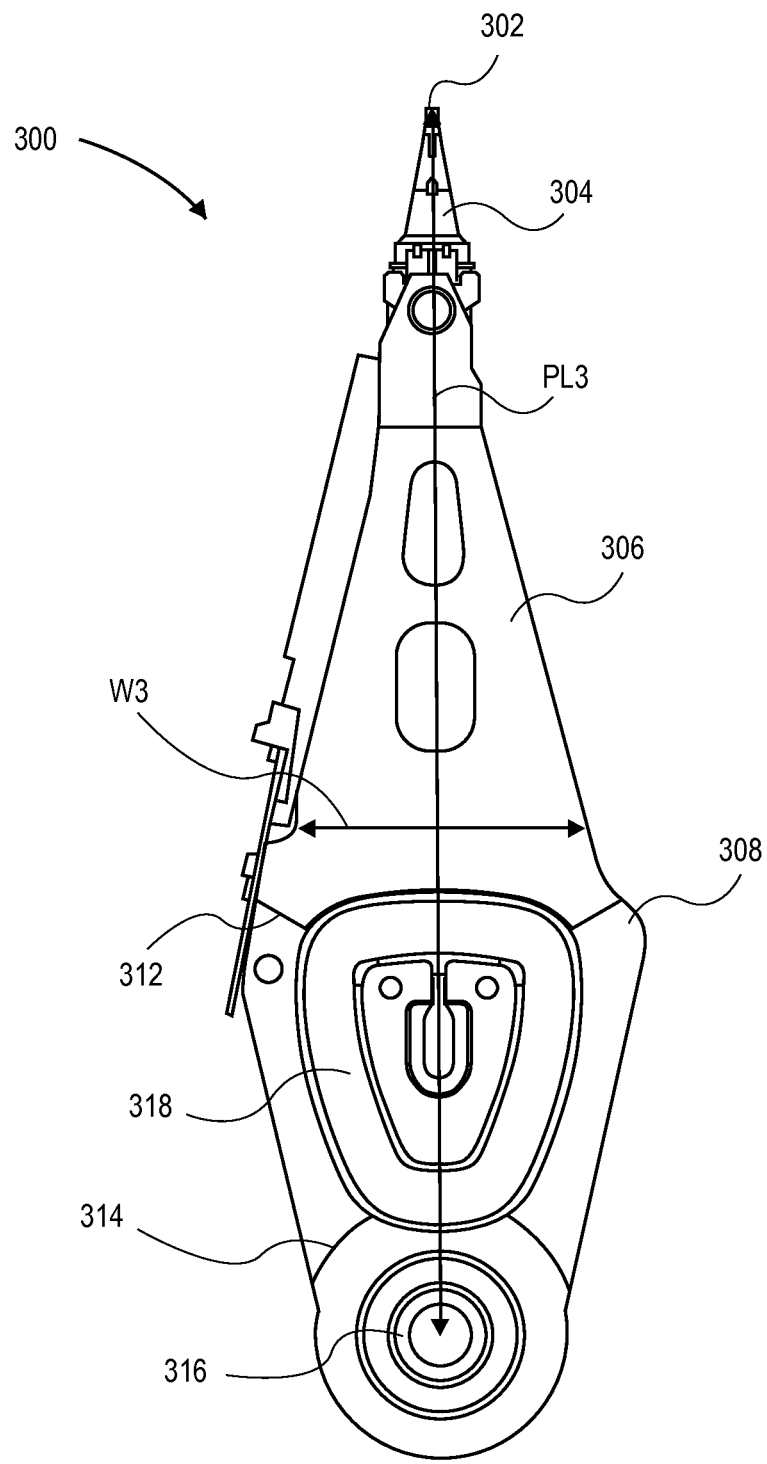
FIG. 3 is a plan view of an interleaved rotary actuator assembly, according to an embodiment of the invention.

FIG. 3 is a plan view of an interleaved rotary actuator assembly, according to an embodiment of the invention. Actuator assembly 300 comprises a head slider 302, which includes a magnetic read/write head for reading data from and writing data to one or more magnetic recording disk. The head slider 302 is coupled to a flexure 304, which is coupled to an actuator arm 306. The actuator arm 306 is coupled to an actuating portion configured to move the head slider to access portions of the disk. The actuating portion has a distal end 312, with which the actuator arm 306 is coupled, and a proximal end 314 which houses a pivot bearing 316. The actuating portion further comprises a voice coil 318 positioned at the distal end 312, between the pivot bearing 316 and the actuator arm 306. The arm 306 of actuator assembly 300 is depicted as having a maximum width, W3, and a pivot length (distance between pivot and head), PL3.

Figure 4:
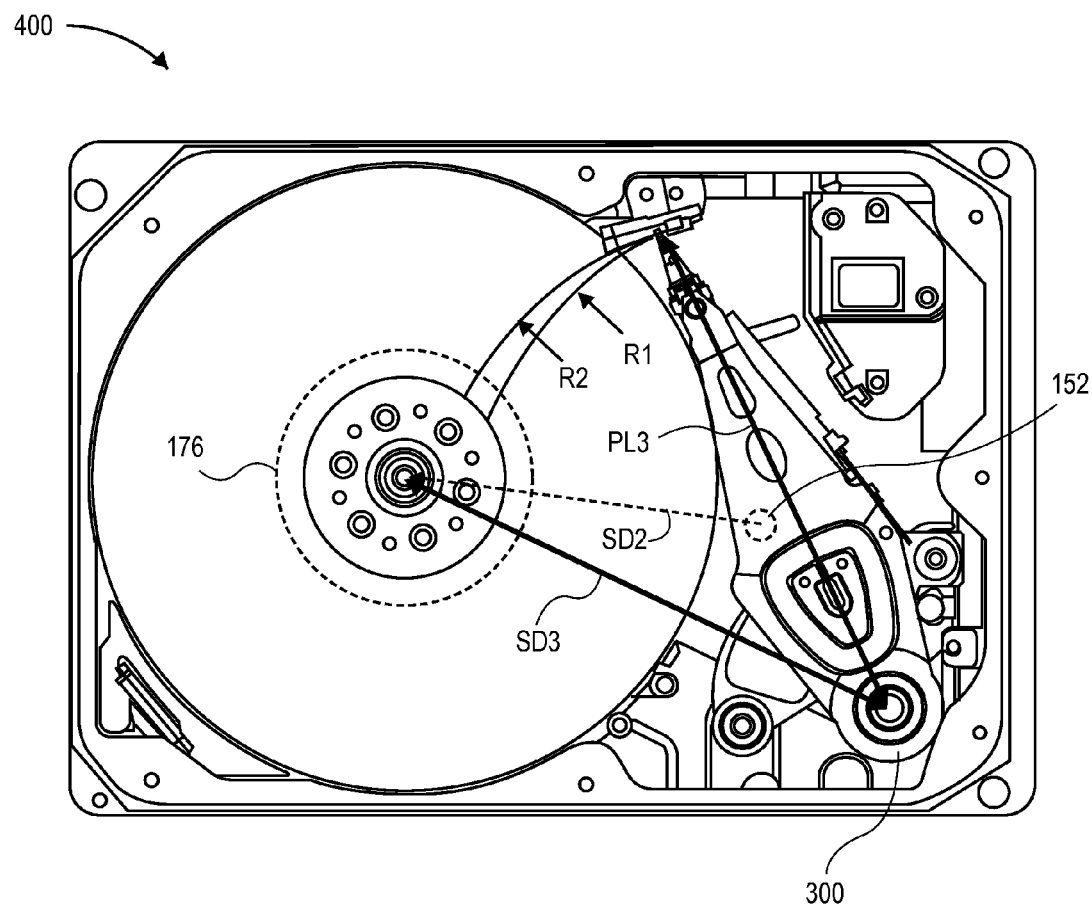
FIG. 4 is a plan view of an HDD having an interleaved rotary actuator assembly, according to an embodiment of the invention.

FIG. 4 is a plan view of an HDD 400 having an interleaved rotary actuator assembly 300 (FIG. 3), according to an embodiment of the invention. As discussed, it is noteworthy that the voice coil 318 is positioned between the pivot bearing 316 and the arm 306, in contrast with conventional actuator assemblies such as rotary actuator assembly 200 (FIG. 2), in which the pivot bearing 152 is positioned between the voice coil 140 and the arm 132. Consequently, according to an embodiment, the pivot length PL3 of actuator assembly 300 is longer than the pivot length PL2 of conventional actuator assembly 200. For example and according to an embodiment, an actuator assembly such as actuator assembly 300 is designed to have a pivot length PL3 of over 50 mm, compared with a pivot length PL2 of approximately 49 mm for a conventional actuator assembly 200 designed for the same HDD form factor. Further, and according to an embodiment, an actuator assembly such as actuator assembly 300 is designed to have a pivot length PL3 in a range of approximately 75-85 mm, significantly greater than what is achievable with a conventional actuator assembly 200 designed for the same HDD form factor. Thus, a longer pivot length PL3 allows for an installation of actuator assembly 300 in which the pivot is closer to the corner of the HDD and, therefore, farther from the disk (compare, e.g., HDD 400 of FIG. 4 with conventional HDD 100 of FIG. 1).

FIG. 4 depicts with a dashed circle generally where pivot bearing 152 would be located if actuator assembly 200 was installed in HDD 400 (see, e.g., FIG. 1 for the corresponding location of pivot bearing 152). The virtual location of pivot bearing 152 in conjunction with the pivot length PL2 of actuator assembly 200 would result in a disk access path radius of curvature R1 associated with actuator assembly 200. By contrast, the location of pivot bearing 316 in conjunction with the pivot length PL3 of actuator assembly 300 provides for a disk access path radius of curvature R2 associated with actuator assembly 300, where radius of curvature R2 is less than radius of curvature R1. As discussed and with further reference to FIG. 4, a longer pivot length PL3 allows for an installation of actuator assembly 300 in which the pivot is closer to the corner of the HDD and, therefore, farther from the disk, such as depicted by comparing spindle distance SD3 of actuator assembly 300 with spindle distance SD2 of actuator assembly 200. For example and according to an embodiment, an actuator assembly such as actuator assembly 300 is designed to have a spindle distance SD3 of over 60 mm, compared with a spindle distance SD2 of approximately 56 mm for a conventional actuator assembly 200 designed for the same HDD form factor. Further, and according to an embodiment, an actuator assembly such as actuator assembly 300 is designed to have a spindle distance SD3 in a range of approximately 75-85 mm, significantly greater than what is achievable with a conventional actuator assembly 200 designed for the same HDD form factor. Therefore, an installation of actuator assembly 300 as depicted in FIG. 4 can facilitate a flatter radius of curvature of the path of the head slider 302 over the disk, which provides for a reduced skew angle in comparison with a skew angle corresponding to the pivot length PL2 of actuator assembly 200. For example, flying over the disk at the same track 176, the skew angle corresponding with interleaved actuator assembly 300 would be less than the skew angle corresponding to conventional actuator assembly 200.

Another design freedom that is enabled by the configuration corresponding to actuator assembly 300 is that the maximum arm width W3 corresponding to actuator assembly 300 (FIG. 3) can be greater than the maximum arm width W2 corresponding to actuator assembly 200 (FIG. 2). Implementing the pivot toward the corner of the HDD, as is enabled with actuator assembly 300, provides for more clearance space between the actuator assembly 300 and the disk, thereby allowing for the greater maximum arm width W3. A wider arm provides for a more stable arm operationally and, therefore, the operational characteristics (e.g., the transfer function) of the actuator assembly 300 are better than the operational characteristics corresponding to a conventional actuator assembly 200. For a non-limiting example, experimentation has shown that in the context of a conventional maximum arm width W2 equal to 13 mm, implementation of an interleaved rotary actuator assembly 300 enables a maximum arm width W3 equal to 21 mm, a non-trivial approximately 60% increase in maximum arm width.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A rotary actuator assembly for a hard disk drive, said actuator assembly comprising:
   a head slider comprising a magnetic read/write head for reading data from and writing data to one or more magnetic-recording disk;
   a flexure, with which said head slider is coupled;
   an actuator arm, with which said flexure is coupled; and
   an actuating portion configured to move said head slider to access portions of said one or more magnetic-recording disk, said actuating portion comprising:
      a distal end with which said actuator arm is coupled,
      a proximal end housing a pivot bearing, and
      a voice coil positioned at said distal end between said pivot bearing and said actuator arm;
   wherein the position of said voice coil between said pivot bearing and said actuator arm provides a lesser skew angle than would otherwise be if said pivot bearing was positioned between said voice coil and said actuator arm.

2. The rotary actuator assembly of claim 1, wherein said voice coil has a wide portion and a narrow portion, and wherein said wide portion of said voice coil is toward the distal end of said actuating portion and said narrow portion of said voice coil is toward the proximal end of said actuating portion.

3. The rotary actuator assembly of claim 1, wherein the distance between (a) a first pivot about which said actuator assembly rotates and (b) said read/write head, is greater than 50 mm.

4. The rotary actuator assembly of claim 1, wherein the distance between (a) a first pivot about which said actuator assembly rotates and (b) said read/write head, is in a range of 75-85 mm.

5. The rotary actuator assembly of claim 1, wherein the distance between (a) a first pivot about which said actuator assembly rotates and (b) a second pivot about which said one or more magnetic-recording disk rotates, is greater than 60 mm.

6. The rotary actuator assembly of claim 1, wherein the distance between (a) a first pivot about which said actuator assembly rotates and (b) a second pivot about which said one or more magnetic-recording disk rotates, is in a range of 75-85 mm.

7. The rotary actuator assembly of claim 1, wherein the width of said actuator arm is greater than would otherwise be if said pivot bearing was positioned between said voice coil and said actuator arm.

8. The rotary actuator assembly of claim 7, wherein the width of said actuator arm is at least 21 mm.

9. A hard disk drive, comprising:
   a head slider comprising a magnetic read/write head for reading data from and writing data to one or more magnetic-recording disk;
   a magnetic-recording disk rotatably mounted on a spindle;
   a flexure, with which said head slider is coupled;
   an actuator arm, with which said flexure is coupled; and
   an actuating portion configured to move said head slider to access portions of said one or more magnetic-recording disk, said actuating portion comprising:
      a distal end with which said actuator arm is coupled,
      a proximal end housing a pivot bearing, and
      a voice coil positioned at said distal end between said pivot bearing and said actuator arm;
   wherein the position of said voice coil between said pivot bearing and said actuator arm provides a lesser skew angle than would otherwise be if said pivot bearing was positioned between said voice coil and said actuator arm.

10. The hard disk drive of claim 9, wherein said voice coil has a wide portion and a narrow portion, and wherein said wide portion of said voice coil is toward the distal end of said actuating portion and said narrow portion of said voice coil is toward the proximal end of said actuating portion.

11. The hard disk drive of claim 9, wherein the distance between (a) a first pivot about which said actuating portion rotates and (b) said read/write head, is greater than 50 mm.

12. The hard disk drive of claim 9, wherein the distance between (a) a first pivot about which said actuating portion rotates and (b) said read/write head, is in a range of 75-85 mm.

13. The hard disk drive of claim 9, wherein the distance between (a) a first pivot about which said actuating portion rotates and (b) a second pivot about which said one or more magnetic-recording disk rotates, is greater than 60 mm.

14. The hard disk drive of claim 9, wherein the distance between (a) a first pivot about which said actuating portion rotates and (b) a second pivot about which said one or more magnetic-recording disk rotates, is in a range of 75-85 mm.

15. The hard disk drive of claim 9, wherein the width of said actuator arm is greater than would otherwise be if said pivot bearing was positioned between said voice coil and said actuator arm.

16. The hard disk drive of claim 15, wherein the width of said actuator arm is at least 21 mm.

17. A hard disk drive, comprising:
   a head slider comprising a magnetic read/write head for reading data from and writing data to one or more magnetic-recording disk;
   a magnetic-recording disk rotatably mounted on a spindle;
   a flexure, with which said head slider is coupled;
   an actuator arm, with which said flexure is coupled; and
   an actuating portion configured to move said head slider to access portions of said one or more magnetic-recording disk, said actuating portion comprising:
      a distal end with which said actuator arm is coupled,
      a proximal end housing a pivot bearing, and
      a voice coil positioned at said distal end between said pivot bearing and said actuator arm, wherein said voice coil has a wide portion toward the distal end of said actuating portion and a narrow portion toward the proximal end of said actuating portion.

18. The hard disk drive of claim 17, wherein the distance between (a) a first pivot about which said actuating portion rotates and (b) said read/write head, is in a range of 75-85 mm.

19. The hard disk drive of claim 17, wherein the width of said actuator arm is greater than would otherwise be if said pivot bearing was positioned between said voice coil and said actuator arm.

* * * * *